United States Patent [19]
Nowak et al.

[11] Patent Number: 6,064,520
[45] Date of Patent: *May 16, 2000

[54] OCULAR MOUNTING ASSEMBLY

[76] Inventors: David Nowak, 7300 Park Lane Dr., Dexter, Mich. 48130; Richard Kim, 12578 E. Laurel La., Scottsdale, Ariz. 85259

[*] Notice: This patent is subject to a terminal disclaimer.

[21] Appl. No.: 09/327,404

[22] Filed: Jun. 7, 1999

Related U.S. Application Data

[63] Continuation of application No. 08/825,196, Mar. 27, 1997, which is a continuation of application No. 08/370,535, Jan. 9, 1995, abandoned, which is a continuation-in-part of application No. 08/093,831, Jul. 19, 1993, Pat. No. 5,381,263.

[51] Int. Cl.$^7$ .................................................. G02B 23/00
[52] U.S. Cl. ......................... 359/411; 359/412; 359/413; 351/58; 351/57; 351/221; 351/49
[58] Field of Search .................................. 359/411, 412, 359/413, 415; 351/58, 57, 221, 223, 49, 205, 47

[56] References Cited

U.S. PATENT DOCUMENTS

| | | | |
|---|---|---|---|
| 3,597,041 | 8/1971 | Frantz | 359/411 |
| 4,196,966 | 4/1980 | Malis | 359/471 |
| 4,364,645 | 12/1982 | Feinbloom | 351/204 |
| 4,449,787 | 5/1984 | Burbo et al. | 359/411 |
| 4,659,196 | 4/1987 | Gazeley | 351/47 |
| 4,681,413 | 7/1987 | Schmidt et al. | 351/205 |
| 4,818,086 | 4/1989 | Moore | 359/414 |
| 5,179,735 | 1/1993 | Thomanek | 2/6 |
| 5,335,110 | 8/1994 | Shin | 359/473 |
| 5,372,504 | 12/1994 | Buechler | 351/47 |

FOREIGN PATENT DOCUMENTS

| | | | |
|---|---|---|---|
| 2251702 | 7/1992 | United Kingdom | 351/47 |

*Primary Examiner*—Cassandra Spyrou
*Assistant Examiner*—Mohammad Y. Sikder
*Attorney, Agent, or Firm*—Gifford, Krass, Groh, Sprinkle, Anderson & Citkowski, PC

[57] ABSTRACT

An ocular mounting assembly for adjustably mounting a pair of ocular devices, such as telemicroscopic loupes, to an eyeglass frame or head mount with linear and rotational adjustments, but with view angle being permanently preset in accordance with working distance. The ocular mounting assembly includes an adjustable ocular support assembly and an adjustable clamp assembly rotatably attached to the ocular support assembly. The ocular mounting assembly includes a housing and two slidable mounting arms to which the ocular devices are attached, the transverse cross-sectional shape of the housing interior and mounting arms being such that substantially all of the volume of the housing interior is consumed apart from close tolerances to facilitate the sliding motion, thus resulting in a structure which cooperates to assist in providing a substantially rigid assembly. The adjustable clamp assembly provides height and view angle adjustment of the ocular devices and allows the ocular devices to be flipped up out of the way when not needed. The height adjustment in conjunction with the view angle adjustment allows the line of sight to be adjusted while the ocular devices are positioned close to the eye or eyeglass lens.

1 Claim, 6 Drawing Sheets

| Angular Mag | Size/Weight | Field-of-view | Working Distance (Range) |
|---|---|---|---|
| 2.15X | ⌀1.23"<br>1.29"<br>0.60 oz. (17 gm) | 3.0" TO 7.0"<br>(78mm TO 176mm) | 9.5" (240mm) to 18.2" (462mm) |
| | | 3.5" TO 9.0"<br>(88mm TO 230mm) | 11.25" (286mm) to 24.7" (628mm) |
| 2.75X | ⌀1.23"<br>1.58"<br>0.67 oz. (19 gm) | 2.3" TO 4.2"<br>(58mm TO 106mm) | 9.8" (250mm) to 15.9" (404mm) |
| | | 2.6" TO 5.4"<br>(66mm TO 136mm) | 12.3" (240mm) to 21.8" (553mm) |
| 3.5X | ⌀1.23"<br>1.58"<br>0.88 oz. (19 gm) | 2.0" TO 3.4"<br>(50mm TO 86mm) | 9.9" (252mm) to 14.3" (362mm) |
| | | 2.2" TO 4.0"<br>(56mm TO 100mm) | 11.7" (297mm) to 17.5" (445mm) |
| | | 2.4" TO 4.3"<br>(60mm TO 110mm) | 13.0" (331mm) to 20.2" (512mm) |
| 5X | ⌀1.23"<br>1.72"<br>0.95 oz. (27 gm) | 1.7" TO 2.7"<br>(42mm TO 68mm) | 10.2" (259mm) to 13.8" (351mm) |
| | | 1.8" TO 3.0"<br>(46mm TO 76mm) | 12.1" (306mm) to 16.8" (427mm) |
| | | 2.1" TO 3.5"<br>(58mm TO 106mm) | 14.1" (358mm) to 20.3" (516mm) |

FIGURE 5.

OCULAR MOUNTING ASSEMBLY

REFERENCE TO RELATED APPLICATION

This is a continuation of Ser. No. 08/825,196, filed Mar. 27, 1997, which is a continuation of Ser. No. 08/370,535, filed Jan. 9, 1995, now abandoned, which is a continuation-in-part of co-pending U.S. patent application Ser. No. 08/093,831, filed Jul. 19, 1993, now U.S. Pat. No. 5,381,263.

BACKGROUND OF THE INVENTION

This invention relates generally to telemicroscopic instruments and, more particularly, to ocular mounting assemblies for adjustably mounting a pair of telemicroscopic loupes to an eyeglass frame or headband.

Telescopic instruments are widely used for magnifying a work area during precision work such as delicate surgery, dental work, inspection of circuit board solder joints, and assembly of miniature parts. A typical telemicroscopic instrument includes a pair of telemicroscopic loupes which are adjustably mounted to an eyeglass frame or headband. The telescopic loupes combine the long working distance of the telescope with the high quality magnification of the microscope. This type of optical instrument provides the user, a surgeon, for example, with a magnified image of the work area with a field of view at about an arm's length. The mounting assemblies typically used in these telemicroscopic instruments provide a variety of degrees of freedom. Although a wide range of adjustments increases flexibility, it also increases the risk that one or more of the adjustments will come loose during use. Accordingly, there has been a need for an ocular mounting assembly which sacrifices at least certain of the adjustments on a predetermined, selective basis in favor of operational stability. By offering three view-angle adjustments with a fixed convergence angle, and other components which promote rigidity, the present invention clearly fulfills this need.

SUMMARY OF THE INVENTION

The present invention resides in a novel ocular mounting assembly for adjustably mounting a pair of ocular devices, such as telemicroscopic loupes, to an eyeglass frame or headband with linear and rotational adjustments, but wherein convergence angle is fixed as a function of working distance, thus providing a highly stable configuration, resistant to vibration or impact and misadjustment during use. The ocular mounting assembly includes an adjustable ocular support assembly and an adjustable clamp assembly rotatably attached to the ocular support assembly. The adjustable clamp assembly provides height and view angle adjustment of the ocular devices and allows the ocular devices to be flipped up out of the way when not needed. The height adjustment in conjunction with the view angle adjustment allows the line of sight to be adjusted while the ocular devices are positioned close to the eye or eyeglass lens.

In a preferred embodiment of the present invention, the ocular support assembly includes a rectangular-shaped ocular support assembly housing, a pair of ocular support arms and an interpupillary adjustment knob. The ocular support arms are slidably disposed within the assembly housing and the adjustment knob is inserted through an opening in the assembly housing to engage a slot in each ocular support arm. The adjustment knob has a set of serrated teeth which engages a set of serrated teeth in each slot, such that rotation of the knob causes the ocular support arms to slide in and out of the assembly housing for adjustment of the interpupillary distance between the two ocular devices.

To further ensure stability against vibration or impact, the width of the ocular assembly housing is maximized as a function of interpupillary distance, and the support arms include stabilizing elements to enhance rigidity. In the preferred embodiment the support arms includes at least two members perpendicular to one another in transverse cross-section to counteract longitudinal twisting. In the preferred embodiment, the support arms are L-shaped in transverse cross-section and overlapped in mirror-image fashion within the housing so that the housing and both support arms consume the greatest volume within the housing and act in conjunction with one another for the highest possible degree of rigidity during use.

A view angle hinge pin is rigidly attached to the ocular support assembly housing for rotatably attaching the ocular support assembly to the adjustable clamp assembly, thus allowing the view angle of the ocular devices to be adjusted. The adjustable clamp assembly includes a pair of clamp assembly members, a clamp assembly housing, a height adjustment rail, and an eyeglass frame mounting clamp. The clamp assembly members have slots that engage the view angle hinge pin and a flip-up hinge pin. The flip-up hinge pin is rigidly attached to the clamp assembly housing and rotatably attaches the clamp assembly members to the assembly housing, thus allowing the ocular devices to be flipped up out of the way when they are not needed.

The clamp assembly housing preferably includes an undercut channel that engages a rectangular-shaped undercut pad on the height adjustment rail, thus allowing the height of the ocular devices to be adjusted. The eyeglass frame mounting clamp and the height adjustment rail clamp together about an eyeglass frame to rigidly attach the clamp assembly to the eyeglass or headband.

It will be appreciated from the foregoing that the present invention represents a significant advance in the field of telemicroscopic instruments. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 5 is a table which lists working distances as a function of angular magnification and other factors used in determining the angle at which convergence should be fixed given a particular application.

DETAILED DESCRIPTION OF THE PREFERRED EMBODIMENT

Figure 1:
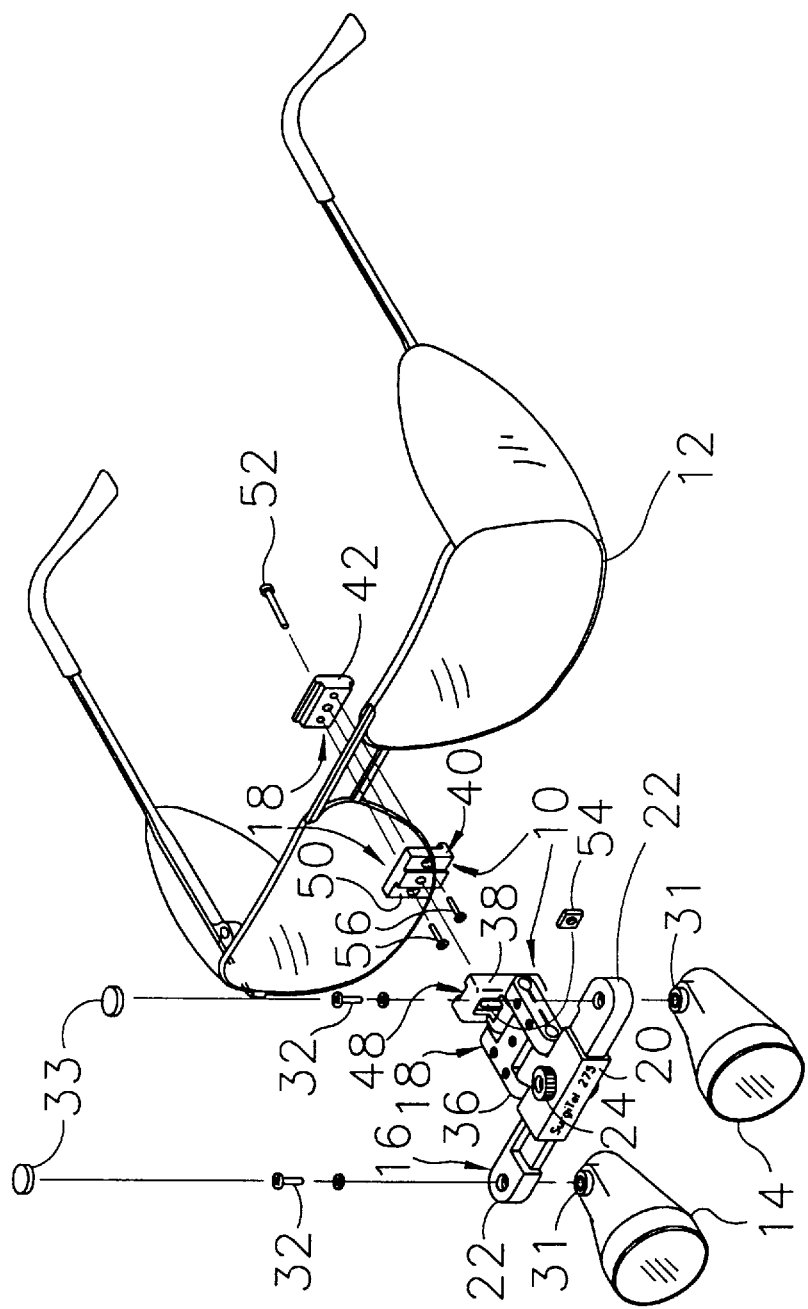
FIG. 1 is a perspective view of a telemicroscopic instrument employing the ocular mounting assembly of the present invention.

As shown in the drawings for purposes of illustration, the present invention is embodied in a novel ocular mounting assembly for adjustably mounting a pair of ocular devices, such as telemicroscopic loupes, to an eyeglass frame or headband with a high degree of vibrational stability. The ocular mounting assembly includes an adjustable ocular support assembly and an adjustable clamp assembly rotatably attached to the ocular support assembly. The ocular support assembly provides only for interpupillary distance adjustment of the ocular devices, and includes a housing and slidable ocular support arms which cooperate to enhance rigidity. The adjustable clamp assembly provides height and view angle adjustment of the ocular devices and allows the ocular devices to be flipped up out of the way when not needed. The height adjustment in conjunction with the view angle adjustment allows the line of sight to be adjusted while the ocular devices are positioned close to the eye or eyeglass lens.

As shown in FIG. 1, an ocular mounting assembly 10 constructed in accordance with the present invention includes an eyeglass frame 12, a pair of ocular devices 14, and the ocular mounting assembly 10 which adjustably mounts the ocular devices 14 to the eyeglass frame 12. The ocular mounting assembly 10 includes an adjustable ocular support assembly 16 and an adjustable clamp assembly 18 that is rotatably attached to the ocular support assembly 16. The ocular support assembly 16 supports the ocular devices 14 and the adjustable clamp assembly 18 is rigidly attached to the eyeglass frame 12.

The ocular support assembly 16 includes a rectangular-shaped ocular support assembly housing 20, a pair of ocular support arms 22 and an interpupillary adjustment knob 24. The ocular support arms 22 are slidably disposed within the assembly housing 20 and the adjustment knob 24 is inserted through an opening in the assembly housing to engage a slot 26 in each ocular support arm 22. The adjustment knob 24 has a set of serrated teeth 28 which engages a set of serrated teeth 30 in each slot 26, such that rotation of the knob 24 causes the ocular support arms 22 to slide in and out of the assembly housing 20 for adjustment of the interpupillary distance between the two ocular devices 14.

The ocular devices 14 are at least initially rotatable with respect to the ends of the ocular support arms 22, thus allowing convergence angle to be fixed. Once convergence angle is determined for a particular working distance, however, the ocular devices 14 are cemented into place by injecting glue in and around the upwardly extending cylindrical flanges 31. The ocular devices are attached by screws 32 which allow the rotational friction of the convergence angle adjustment to be varied prior to the ocular devices being cemented. Once the ocular devices are locked in position based upon a particular viewing angle, covers 33 may optionally be adhered to the top of each support arm 22 to ensure that the user is given a clear impression that convergence angle is no longer adjustable.

Figure 2:
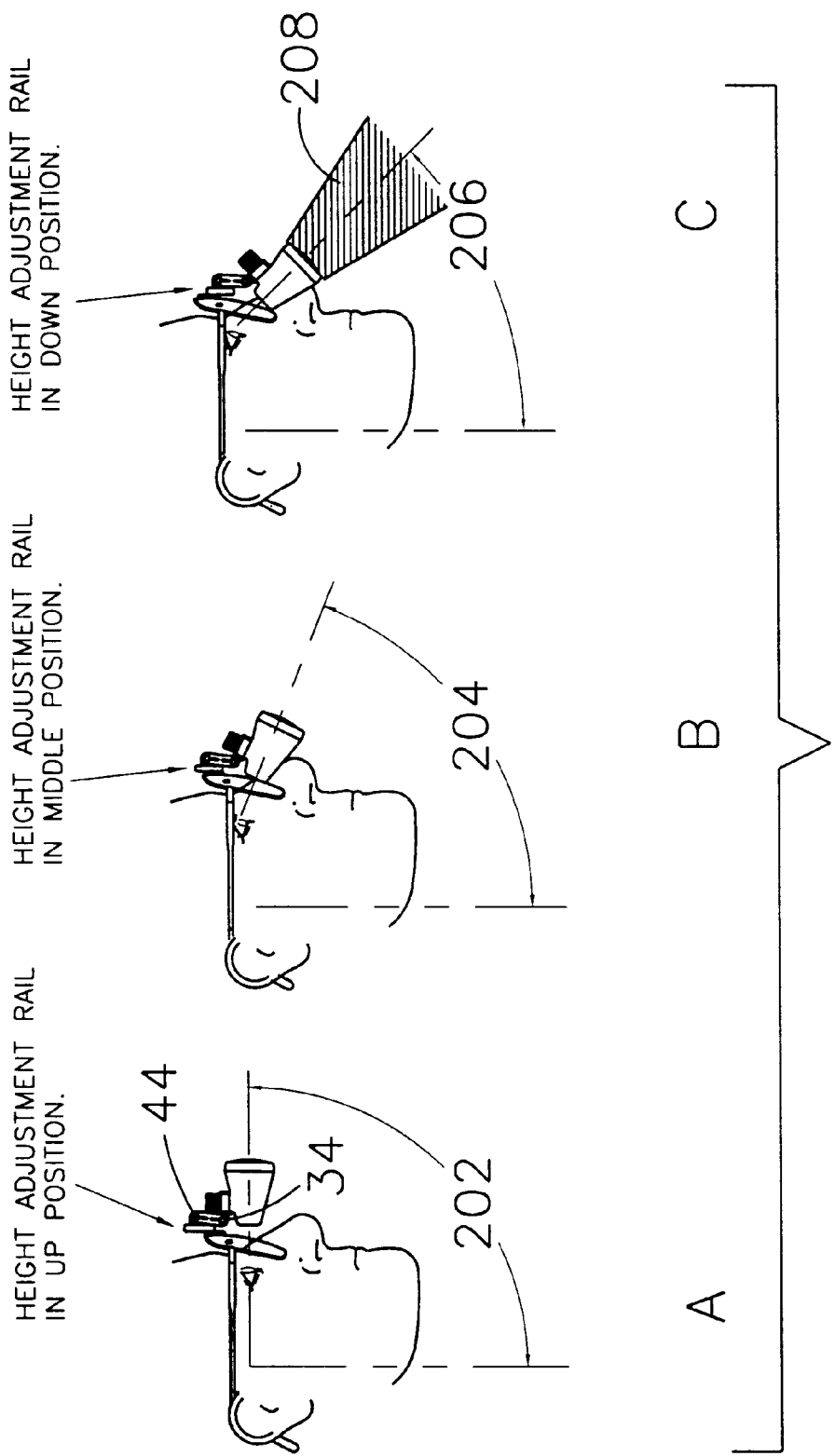
FIG. 2A is a side view drawing of the invention in use with the height adjustment rail in the up position.
FIG. 2B is a side view drawing of the invention in use with the height adjustment rail in the middle position.
FIG. 2C is a side view drawing of the invention with the height adjustment rail in the down position, which also best illustrates bi-vision capability.

FIGS. 2A, 2B and 2C illustrate the advantage of combining parallel view-angle and flip-up hinge pins (34 and 44, respectively) along with a height adjustment rail. Although FIG. 2 shows the mounting in use with an eyeglass-oriented configuration, the following discussion applies equally well to the headband-mounted version discussed with reference to FIG. 6. FIG. 2A shows how, with the height adjustment in the up position, the oculars may be set for a near-horizontal angle 202, while maintaining close distance to the eyes of the user. As shown in FIG. 2B, by moving the height adjustment rail to the middle position, the distance to the eyes may be maintained while decreasing the angle of view for mid-range viewing, as depicted by angle 204. In FIG. 2C, with the height adjustment rail in the down position, the angle may be decreased further to the sharp angle 206 while maintaining a close distance to the eyes of the user. It should be clear, then, that the flip-up hinge pin is useful not only for the flip-up function, but also serves as a third degree of freedom in adjusting view angle while maintaining a close distance to the eyes of the user. Only by combining a view-angle hinge pin, flip-up hinge pin and vertical adjustment rail of some kind, is this degree of flexibility possible. FIG. 2C also best illustrates how the invention accommodate excellent bi-vision capability in that normal vision is available through angle of view 204 while magnified vision is available through the oculars as depicted by area 208. This gives a full, unrestricted normal vision over the top of the oculars and normal peripheral vision at right and left sides, which allows for an easy exchange of clinical instruments during procedures using normal vision while maintaining doctor-patient and doctor-assistant eye contact.

Figure 3:
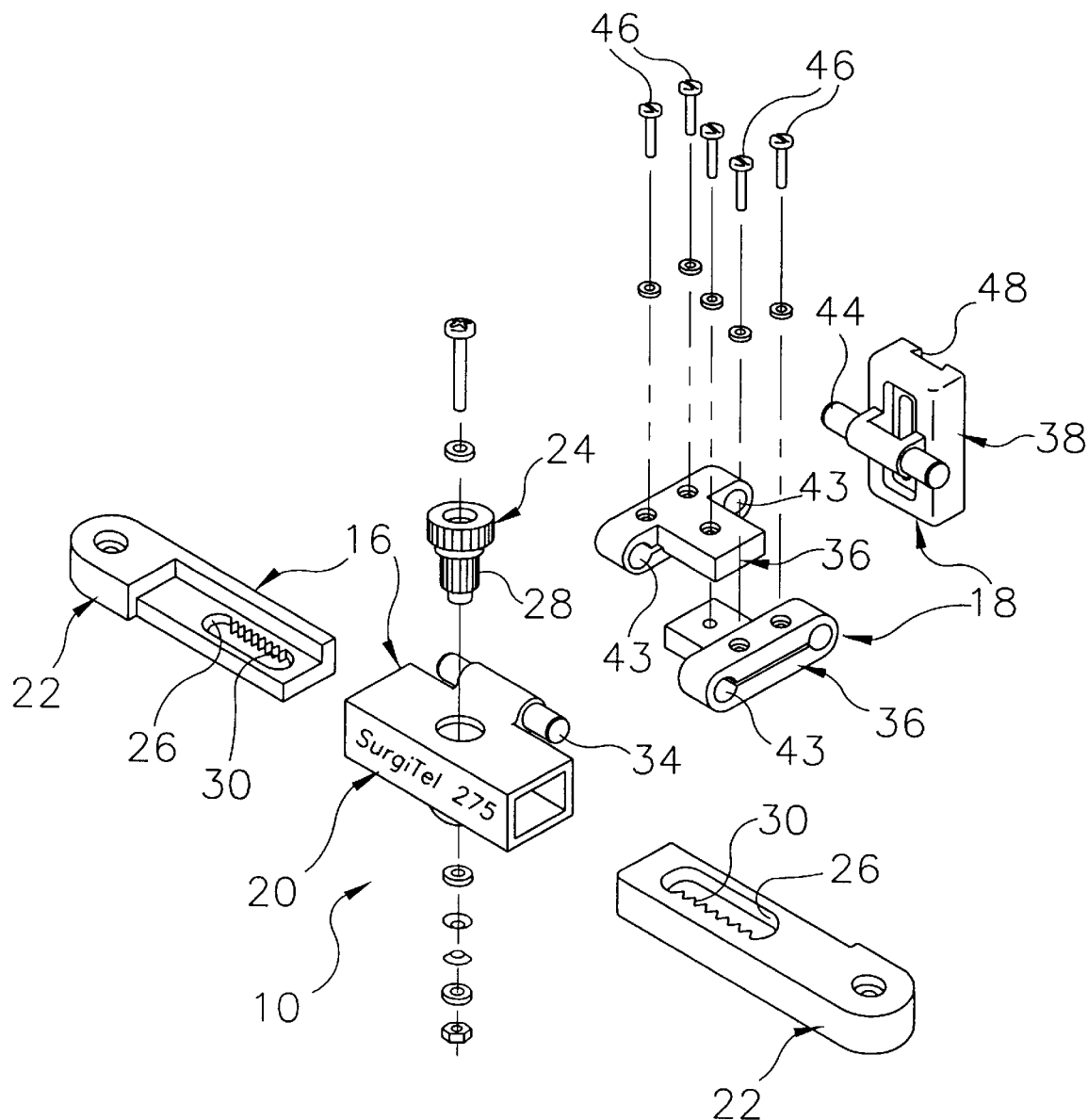
FIG. 3 is a perspective view of the ocular mounting assembly showing the various parts of the assembly.

As shown in FIG. 3, a view angle hinge pin 34 is rigidly attached to the ocular support assembly housing 20 for rotatably attaching the ocular support assembly 16 to the adjustable clamp assembly 18, thus allowing the view angle of the ocular devices 14 to be adjusted. The adjustable clamp assembly 18 includes a pair of clamp assembly members 36, a vertically translatable element 38, a height adjustment rail 40, and an eyeglass frame mounting clamp 42. The clamp assembly members 36 have openings 43 that engage the view angle hinge pin 34 and a flip-up hinge pin 44. The flip-up hinge pin 44 is rigidly attached to the vertically translatable element 38 and rotatably attaches the clamp assembly members 36 to the vertically translatable element 38, thus allowing the ocular devices 14 to be flipped up out of the way when they are not needed. The clamp assembly members 36 are fastened together with screws 46 which allow the rotational friction of the view angle adjustment and the flip-up hinge to be varied.

The clamp assembly housing 38 includes an undercut channel 48 that engages a rectangular-shaped undercut pad 50 on the height adjustment rail 40, thus allowing the height of the ocular devices 14 to be adjusted. The height adjustment in conjunction with the view angle adjustment allows the line of sight to be adjusted while the ocular devices are positioned close to the eye or eyeglass lens. A screw 52 and nut 54 lock the clamp assembly housing 38 to the height adjustment rail 40 once the desired height of the ocular devices 14 is selected. The eyeglass frame mounting clamp 42 and the height adjustment rail 40 clamp together about the eyeglass frame 12 using screws 56 to rigidly attach the clamp assembly 18 to the eyeglass frame. The mounting clamp can also be used to mount the ocular mounting assembly to a head mount.

Figure 4A:
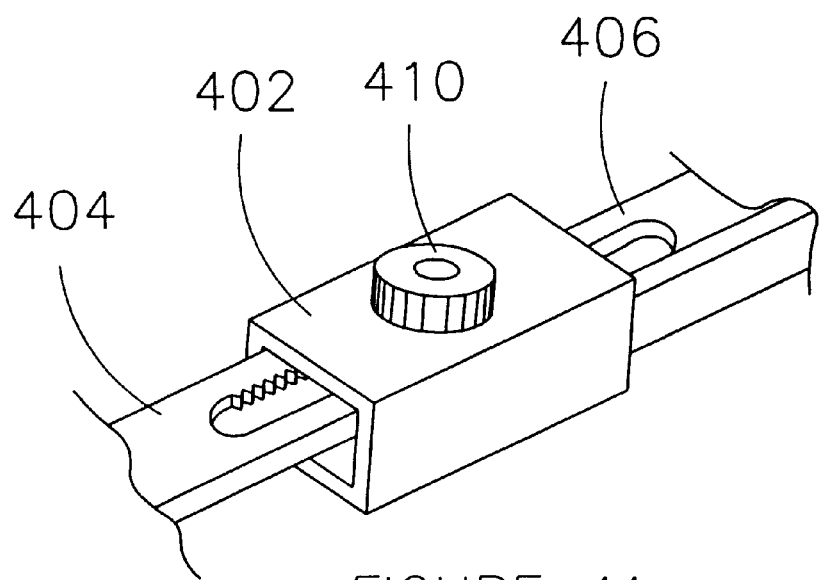
FIG. 4A is an oblique drawing which shows ocular support arms extending from the prior-art housing.

FIG. 4A shows a prior-art housing 402 and ocular support arms 404 and 406. As in the present invention, each support arm includes an elongated aperture formed therethrough, with one inside edge of each slot including serrations which mate with the interpupillary distance adjustment control knob 410. However, in this prior-art design, the serrated, elongated slots extend nearly the entire length of the support arms and terminate in the vicinity of the ocular mount points, leading to a situation wherein with the support arms fully extended, these serrated slots likewise extend past the right and left entrances to the housing 402. This situation severely impacts rigidity in that instead of two solid support arms extending from either side of the housing, it is though there are two partial support arm pieces extending from either side of the housing, or four elongated members in total, which is quite prone to a twisting moment along an axis through the two support arms. This twisting moment and related problems are particularly pronounced if heavier weight oculars are used, and the entire assembly receives a sharp impact, which results in the angle of use between the two oculars to be highly unstable and mismatched.

Figure 4B:
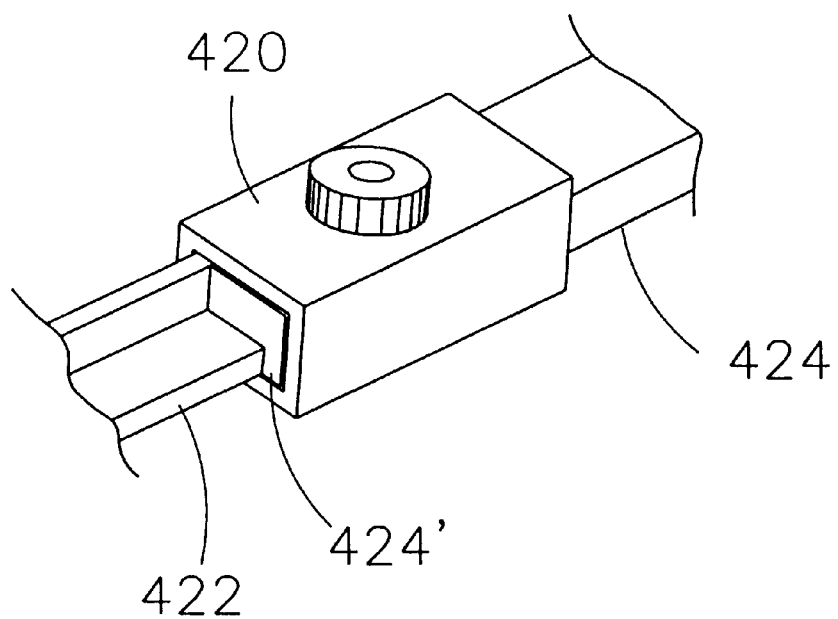
FIG. 4B is an oblique drawing which illustrates the improved housing/support arm configuration of the present invention, wherein the slots of the support arms are at all times maintained within the housing.

FIG. 4B shows an improved version of the support housing 420 characteristic of the present invention, wherein although the support arms in the preferred embodiment also include elongated serrated slots, the width of the housing and the width of the slots are adjusted so that, even in the fully extended position, the serrated portions of the arms do not leave the housing. As such, the L-shaped cooperative structure associated with the two arms, as evidenced by the extended portion of the arm 422 and the side-view of the arm 424', is never compromised, since the serrated apertures are always contained within the housing 420.

FIG. 5 is a table which lists four versions of the oculars used in the invention, each with a different angular magnification. This table is used for illustrative purposes only, and it should be understood that other characteristics in terms of magnification, size/weight, field-of-view and working distances are entirely possible. Making use of the values provided in FIG. 5, it can be seen that for an angular magnification of 2.15× and fields of view ranging from three inches to nine inches, working distances in the range 9.5 inches to 24.7 inches result. According to the invention, then, for example, given an angular magnification of 2.15× and a field of view of three to seven inches, resulting in a working distance or range of 9.5 to 18.2 inches, the convergence angle will be fixed and the ocular cemented in place for a working distance somewhere in the central region between these two limits. In the preferred case, the working distance is factory preset precisely at the midpoint between these two values, resulting in a typical working distance of 13.85 inches.

Although it may seem that a fixed convergence angle at a given working distance may work against the flexibility of the resulting instrument and lead to a deterioration of image quality, in fact, it has been shown that image quality over the entire working range is not noticeably affected, and that in the trade off between providing the type of vibrational stability possible by fixing the convergence angle and a convergence angle which is widely adjustable, a factory setting of the convergence angle is favorable, particularly if the design somehow allows the convergence angle adjustments to loosen, in which case the oculars will move during use resulting in an inconvenient if not dangerous situation. As with the fixed working distance just discussed, all of the working distances shown in FIG. 5 for all of the various angular magnifications may be similarly preset though, in some cases, deviations away from an exact midpoint in terms of working distance may be necessary depending upon angular magnification and field of view.

Figure 6:
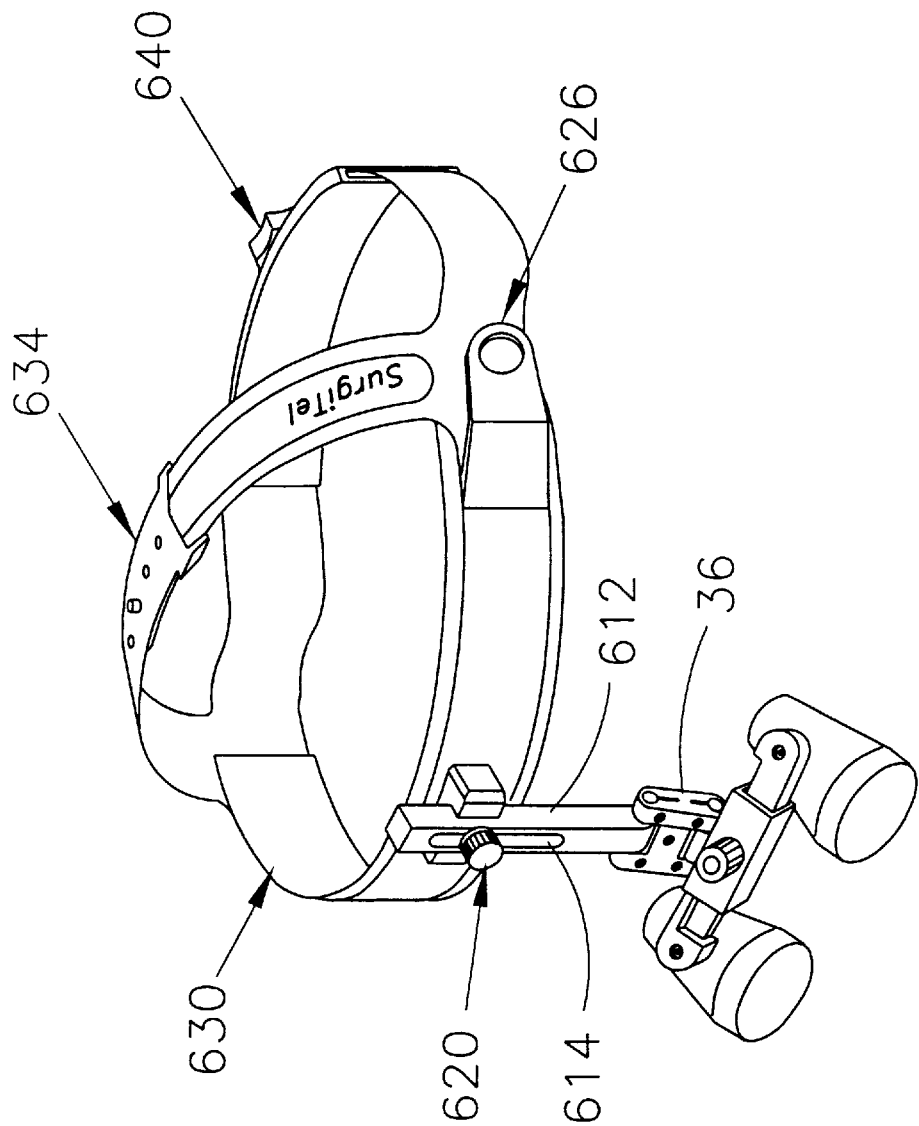
FIG. 6 is an oblique view of a headband mounted version of the invention.

FIG. 6 is an oblique drawing which illustrates a headband mounted version of the invention. In place of the vertically translatable element 38, height adjustment rail 40 and other elements specifically associated with the eyeglass-mount version, the clamp assembly members 36 are instead coupled to a vertically elongated element 612 having a vertical slot 614 through which a height adjustment knob 620 extends. This height adjustment knob 620 allows the user to lock the member 612 at any point with respect to the slot 614, thereby offering the same three-part movement with which the eyeglass-mount version is capable with respect to view-angle adjustment. As with the clamp assembly members 36, all other components associated with ocular mounting may be otherwise identical to the eyeglass version. Other features associated with the headband mount include optional face shield mount 626, a disposable sweatband 630 and overhead strap adjustment 634, and an adjustment 640 adjusting the headband overall.

From the foregoing, it will be appreciated that the present invention represents a significant advance in the field of telemicroscopic instruments. Although a preferred embodiment of the invention has been shown and described, it will be apparent that other adaptations and modifications can be made without departing from the spirit and scope of the invention. Accordingly, the invention is not to be limited, except as by the following claims.

We claim:

1. A head-mounted ocular assembly, comprising:

an ocular support assembly including a pair of slidably disposed ocular support arms, each with an end for supporting a pair of ocular devices rotatably attached to the ends of the ocular support arms, each ocular support arm including a set of serrated teeth;

an interpupillary adjustment knob having a gear with teeth that physically engage with the serrated teeth of the ocular support arms, whereby rotation of the interpupillary adjustment knob causes the ocular support arms to slide in and out of the assembly housing for adjustment of the interpupillary distance between the two ocular devices;

a clamp assembly which frictionally engages a pair of view-angle hinge pins defining a first axis of rotational freedom and a pair of flip-up hinge pins defining a second axis of rotational freedom, the two axes of rotational freedom being spaced apart and parallel to one another, wherein view angle is adjusted by rotating the ocular support assembly about the first axis, and the ocular devices are flipped up by rotating the ocular support assembly and clamp assembly members about the second axis;

a height adjustment rail coupled to the clamp assembly through the flip-up hinge pins; and a head mount to which the assembly attaches through the height adjustment rail.

\* \* \* \* \*